United States Patent [19]
Naghshineh et al.

[11] Patent Number: 5,974,456
[45] Date of Patent: Oct. 26, 1999

[54] SYSTEM AND METHOD FOR INPUT/OUTPUT FLOW CONTROL IN A MULTIPROCESSOR COMPUTER SYSTEM

[75] Inventors: Kianoosh Naghshineh, Menlo Park; Daniel E. Lenoski, San Jose, both of Calif.

[73] Assignee: Silicon Graphics, Inc., Mountain View, Calif.

[21] Appl. No.: 08/892,879

[22] Filed: Jul. 15, 1997

Related U.S. Application Data

[63] Continuation of application No. 08/435,448, May 5, 1995, abandoned.

[51] Int. Cl.$^6$ .................................................. G06F 15/02
[52] U.S. Cl. .............................. 709/223; 710/6; 710/39
[58] Field of Search ............................... 709/223; 710/1, 710/2, 3, 4, 5, 6, 36, 39, 40

[56] References Cited

U.S. PATENT DOCUMENTS

| | | | |
|---|---|---|---|
| 4,472,787 | 9/1984 | Busby | 395/285 |
| 4,706,190 | 11/1987 | Bomba et al. | 395/288 |
| 4,744,023 | 5/1988 | Welsch | 395/200.13 |
| 4,875,037 | 10/1989 | Escolar | 340/825.01 |
| 4,952,930 | 8/1990 | Franaszek et al. | 340/825.8 |
| 5,222,085 | 6/1993 | Newman | 370/422 |
| 5,367,695 | 11/1994 | Narad et al. | 395/800 |
| 5,471,601 | 11/1995 | Gonzales | 395/403 |
| 5,488,706 | 1/1996 | Wendorf et al. | 395/825 |
| 5,493,569 | 2/1996 | Buchholz et al. | 370/442 |

OTHER PUBLICATIONS

M. Galles and E. Williams, *Performance Optimizations, Implementation, and Verification of the SGI Challenge Multiprocessor*, Proceedings of the Twenty–Seventh Annual Hawaii International Conference on System Sciences, pp. 134–143, 1994.

IEEE Std. 1597–1992, *IEEE Standard for Scalable Coherent Interface (SCI)*, Institute of Electrical and Electronics Engineers, Inc., pp. 96–100, Aug. 2, 1993.

*Primary Examiner*—Moustafa M. Meky
*Attorney, Agent, or Firm*—Sterne, Kessler, Goldstein & Fox P.L.L.C.

[57] ABSTRACT

An input/output flow control system for a processor system having an input/output request source (e.g., a processor) and a plurality of input/output request targets (e.g., I/O busses) uses a NACKing (negatively acknowledging) scheme to prevent a common I/O path from becoming blocked due to the blockage of one or more I/O buses. The system includes a flow controller associated with each of the targets for receiving input/output requests from the source, for accepting (ACKing) a request if the intended target can accept the request, and for NACKing a request if the intended target cannot accept the request. The system also includes a processor or source interface for resending the NACKed requests to the intended target and for cooperating with the flow controller so that the NACKed requests are accepted by the flow controller in the proper order.

10 Claims, 7 Drawing Sheets

SYSTEM AND METHOD FOR INPUT/ OUTPUT FLOW CONTROL IN A MULTIPROCESSOR COMPUTER SYSTEM

This application is a continuation of application Ser. No. 08/435,448, filed May 5, 1995, now abandoned.

BACKGROUND OF THE INVENTION

1. Field of the Invention

The invention relates generally to input/output flow control for a computer system and, more particularly, to a system and method for controlling the flow of input/output requests in a distributed shared memory multiprocessor system.

2. Related Art

In multiprocessor computer systems, there may be common input/output (I/O) access paths which enable the individual processors to access a plurality of different I/O interfaces or busses. Sharing of these common I/O access paths is, at times, troublesome. For example, one particularly troublesome problem is when one or more processors begin to overrun one of the I/O busses. This can cause the common I/O access path to become blocked. Once the common I/O access path becomes blocked, all I/O going through the common access path is stopped. I/O requests to other I/O busses will be prevented even through those busses are not busy. Thus, the backup of a single I/O bus will prevent I/O requests from reaching all other I/O busses sharing the common access path.

Overruns occur because one or more processors are accessing a target I/O bus faster than the bus is capable of accepting the transactions. Overrunning can also occur because the I/O bus has a temporary condition which forces a delay in processing one of the posted requests.

It is desirable to minimize the interference by a backed-up or overrun I/O bus to other I/O busses sharing the common I/O access path.

SUMMARY OF THE INVENTION

The invention is an input/output flow control system for use with a processor system having an input/output request source (e.g., a processor) and a plurality of input/output request targets (e.g., I/O busses). The invention uses a negatively acknowledging (NACKing) scheme to prevent a common I/O path from becoming blocked due to the blockage of one or more I/O buses. The system includes a flow controller associated with each of the targets for receiving input/output requests from the source, for accepting (ACKing) a request if the intended target can accept the request, and for NACKing a request if the intended target cannot accept the request. The system also includes a processor or source interface for resending the NACKed requests to the intended target and for cooperating with the flow controller so that the NACKed requests are accepted by the flow controller in the proper order.

To accomplish this, the I/O flow controller keeps track of the buffer capacity of each I/O bus to which it is connected. It is the responsibility of the I/O controller to NACK requests made to a blocked I/O bus. A blocked I/O bus is an I/O bus whose buffer is full so that it cannot post additional requests. For each I/O bus connected to it, the flow controller implements the following functionality.

The flow controller has two modes of operation, normal and retry. In normal mode, requests to an I/O bus are ACKed (accepted and acknowledged). Once a bus becomes blocked, the flow controller will NACK new requests made to that bus. Upon NACKing a request, the flow controller enters retry mode for that bus and begins to count the number of NACKed messages which are outstanding. Upon ACKing all NACKed requests (as indicated by the count), I/O flow controller returns to normal mode.

In normal mode, the flow controller will accept I/O requests from any source as long as the target I/O bus is not blocked. In retry mode, the flow controller will accept only certain requests (i.e., head retry requests).

The processor interface receives I/O requests from particular processors assigned to it. In the preferred embodiment of the invention, a processor interface services either one or two processors. The processor interface implements the functionality described herein for each processor.

The processor interface receives I/O requests from a processor. These I/O requests are then transmitted to a target I/O bus via an appropriate I/O flow controller. Like the flow controller, the processor interface operates in either normal (processor) mode or retry mode. In normal mode, the processor interface will send I/O requests in a normal fashion. However, upon receiving a NACK, the processor interface will enter retry mode. In retry mode, the processor interface will prevent the requesting processor from sending additional requests (e.g., by deasserting write_ready on the processor) and will designate NACKed I/O requests as retry requests. Retry requests are retransmitted to the I/O flow controller. To maintain the proper order of the requests, a request number is entered into a request buffer (FIFO) each time a request is sent by the processor interface. Upon being NACKed, the request corresponding to the request number at the top of the request buffer is designated as a head retry request.

The flow controller will continue to NACK requests to the blocked I/O bus until it becomes unblocked. Once the bus becomes unblocked, the flow controller will NACK all requests except for head retry requests. Upon receiving an ACK (indicating that a head retry request has been accepted), the processor interface will designate the next NACKed request (as indicated by the request buffer) as the new head retry request. This will continue until all NACKed requests have been accepted by the flow controller. Once all NACKed requests have been ACKed, the processor interface will return to normal mode (for the particular processor, since mode is set on a processor by processor basis) and allow the processor to send new requests (e.g., assert write_ready on the processor).

Note that the invention keeps NACKed requests in-flight. By "in-flight.," it is meant that the requests are continuously recirculated between the processor interface and the flow controller until they are accepted. In effect, the NACKed requests are stored "on the wires" until they are accepted. In an alternate embodiment, buffering may be provided in the processor interface to store the NACKed requests until the target I/O bus becomes unblocked. In another alternate embodiment, only head retries are stored "on the wires" and normal retries may be stored in the processor interface. However, in the preferred embodiment, buffering of requests is not required. The NACKed requests (both head retries and normal retries) are simply kept in-flight and the processor is prevented from sending new requests until the NACKed request have been satisfied. In the preferred embodiment, each processor can have up to eight I/O requests in-flight at any one time.

Note also that a processor may have in-flight or outstanding NACKed requests from more than one I/O bus through the same or different flow controller. In either case, the processor interface will select a single head retry request for the processor. In an alternate embodiment, it may be desirable to configure the processor interface to use multiple head retry requests so that retries to different buses can each have their own head retry request. This scheme, however, is not required. Acceptable performance in most applications may be achieved using a single head retry request per processor.

Thus, the processor interface generally does not care about the destination of requests when designating a request as the head retry request. Similarly, the flow controller does not care which processor is the source of a NACKed request. A particular blocked I/O bus may have outstanding NACKed requests from a number of processors. The flow controller simply tracks the number of NACKed requests for that bus and will only accept head retry requests for the particular bus as long as the flow controller is in retry mode for that particular bus.

Circumstances can be imagined in which a processor in a multiprocessor system become effectively starved because it competes for a particular bus but is consistently NACKed while another processor has its requests accepted. For example, if two processors (e.g., processors A and B) are competing for a single bus which is blocked, timing conditions may exist such that each time the bus is unblocked, a head retry request of processor A arrives and is accepted. When the head retry request of processor B arrives after acceptance of the request from processor A, the bus is again blocked and processor B's request is NACKed. The present invention anticipates that such a scenario is possible. To prevent a processor from having its I/O requests starved in favor of another processor's I/O requests, one embodiment of the invention implements an alternating flow control scheme.

The foregoing and other features and advantages of the invention will be apparent from the following, more particular description of a preferred embodiment of the invention, as illustrated in the accompanying drawings.

BRIEF DESCRIPTION OF THE FIGURES

The present invention as defined by the claims is better understood with reference to the written description read in conjunction with the following drawings. In the drawings, like reference numbers are used to indicate like elements. Also in the drawings, the left most digit of each reference number corresponds to the figure in which the reference number is first used.

DETAILED DESCRIPTION OF THE PREFERRED EMBODIMENTS

The preferred embodiments of the invention are discussed in detail below. While specific part numbers and/or configurations are discussed, it should be understood that this is done for illustration purposes only. A person skilled in the relevant art will recognize that other components and configurations may be used without parting from the spirit and scope of the invention.

Figure 1:
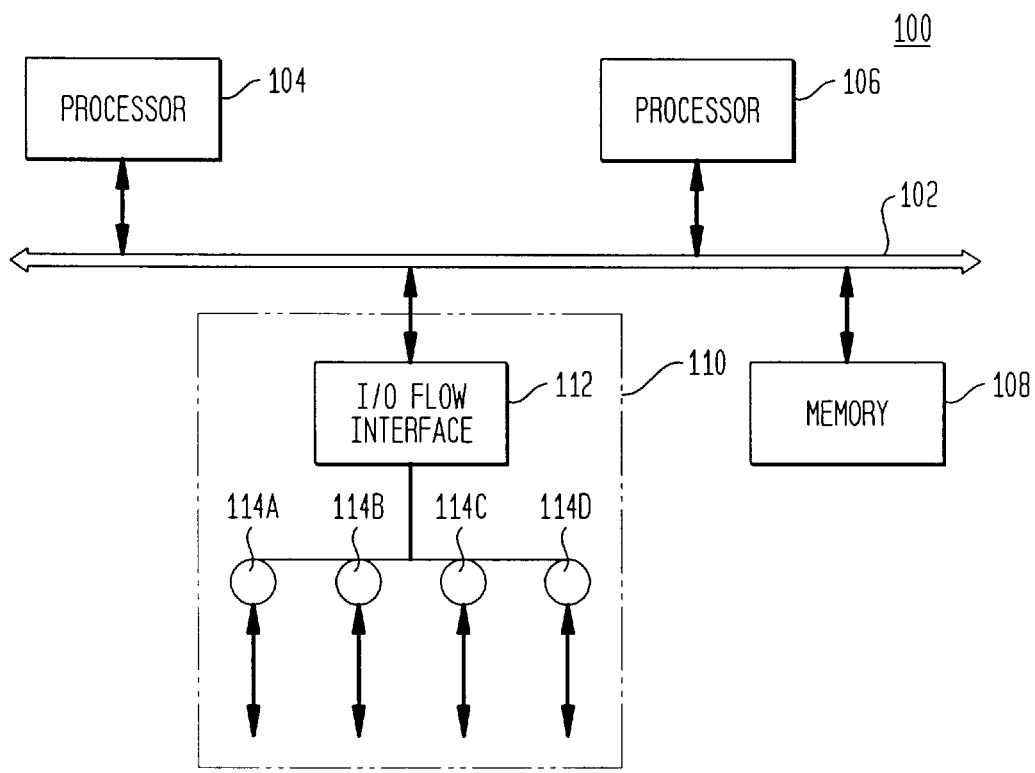
FIG. 1 illustrates connection of a plurality of I/O buses to a multiprocessor computer system through a common access path.

FIG. 1 represents an example multiprocessor system 100. Processor system 100 includes a system bus 102, a processor subsystem 104, a processor subsystem 106, a memory 108 and an I/O subsystem 110. I/O subsystem 110 includes an I/O flow interface 112 and one or more I/O interfaces or busses 114. I/O flow interface 112 receives I/O requests from processor subsystems 104,106 over bus 102. I/O flow interface 112 maintains a FIFO (first-in, first-out) buffer for I/O requests directed to I/O busses 114. In addition, each I/O bus 114 includes a FIFO buffer for holding I/O requests until they can be processed.

A particular I/O bus 114, e.g., I/O bus 114A, may become blocked. By blocked, it is meant that the buffer of the bus is full so that it cannot hold any addition requests. In this case, the I/O request may be buffered by I/O flow interface 112. However, if a request for a blocked bus is buffered in interface 112, then flow interface 112 will become blocked once the request reaches the top of the buffer. Requests to other I/O busses 114 which are posted after the request to the blocked bus will not be able to pass through interface 112 until the blocked bus is able to accept the buffered request.

One approach to avoiding this blockage is for interface 112 to keep track of the number of unsatisfied I/O requests in the buffers of I/O busses 114. Then, if an I/O bus 114 has a full buffer, interface 112 may not accept any I/O requests directed to that particular I/O bus. This will prevent interface 112 from becoming blocked.

If an I/O request is not accepted by flow interface 112, then it is negatively acknowledged or NACKed. When a request is NACKed, it is not accepted and a reply is sent back to the requesting processor indicating that the request was not buffered. The NACK reply includes the originally send I/O request and may also be called a NACKed I/O request.

Upon receiving a NACK, the processor may retransmit it. If the blocked bus 114 has become unblocked since the NACK, interface 112 may accept the request. Upon accepting (buffering) a request, interface 112 positively acknowledges or ACKs the request. This involves sending an ACK reply back to the requesting processor indicating that the request was successfully accepted.

A problem with I/O systems which implement a NACK is that several requests to a single I/O bus may be sent in rapid succession. If the first message is NACKed, the NACK may not be received back at the processor until after the other requests are in-flight. If the blocked bus 114 becomes unblocked after NACKing the first request, a second request may be ACKed. The first request may then be retried and ACKed after the second request has been ACKed. This results in the requests being received by a bus 114 in a different order from that intended by the requesting processor. For unrelated I/O requests, this may be acceptable. Oftentimes, however, it is critical that I/O requests be satisfied in a certain order. For example, if characters are being displayed on a monitor, it is important that the characters be displayed in the intended order.

One method for avoiding this result is to always wait for each request to be ACKed before sending a next request. However, this severely limits the bandwidth of the computer system.

What is needed is an I/O flow control system in which the blockage of I/O requests to a given I/O bus does not interfere with other accesses to other I/O busses that share the same access path. Such a system must also be able to guarantee that the order of I/O requests issued by a single processor to a particular bus is maintained. It is desirable that such an I/O flow control system will not restrict bandwidth of a particular I/O bus when it is not busy. It is also desired that the system be implemented with minimal gate count and complexity.

The present invention is an I/O flow control system and method which overcomes the shortcomings outlined above. The preferred embodiment of the invention is described in the environment of a distributed shared memory (DSM) multiprocessor utilizing a coherent switch-based interconnect. The DSM multiprocessor includes a plurality of nodes interconnected in, for example, a hypercube topology. Such a DSM multiprocessor is described in detail in commonly-owned, copending U.S. patent application Ser. No. 08/435, 456, now U.S. Pat. No. 5,682,479, filed on even date herewith, entitled "System and Method for Network Exploration and Access in a Multiprocessor Environment," the full text of which is incorporated herein by reference as if reproduced in full below.

Figure 2:
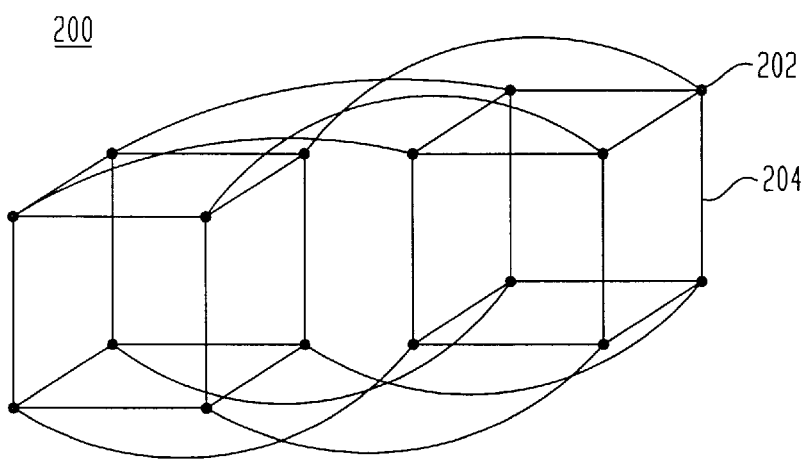
FIG. 2 illustrates a hypercube network configuration for a multiprocessor system.

For purposes of illustration, a sample hypercube topology is briefly described with reference to FIG. 2. FIG. 2 illustrates a hypercube network 200. Network 200 includes a plurality of nodes 202 connected by edges or links 204. This hypercube includes, for example, sixteen nodes. As discussed in the above-reference patent application, the complexity of each node 202 can vary depending on the particular implementation of the multiprocessor system.

Figure 3:
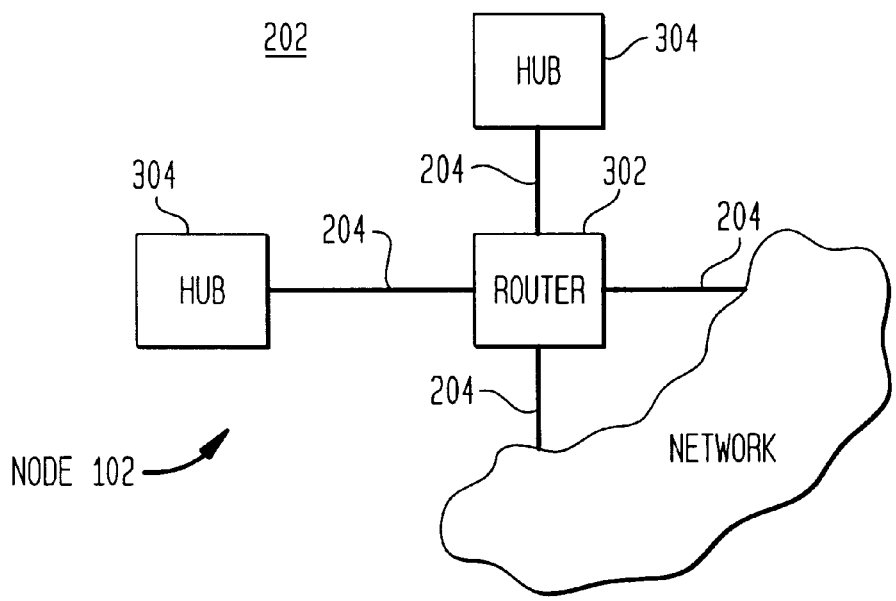
FIG. 3 is a block diagram illustrating an example node of the hypercube network of FIG. 2.

In its simplest form, each node 202 is a microprocessor functioning as a computing engine in a multiprocessing engine of the multiprocessor system. In more complex environment, each node can support multiple processors and/or I/O functionality. For example, a relatively complex node architecture is illustrated in FIG. 3. In this architecture, each node 202 includes a router 302 and one or more hubs 304. Router 302 makes the appropriate connections between other nodes 202 of the network 200 via edges 204 in the one or more hubs 304. Each hub 304 can include one or more processors and/or I/O devices.

Figure 4:
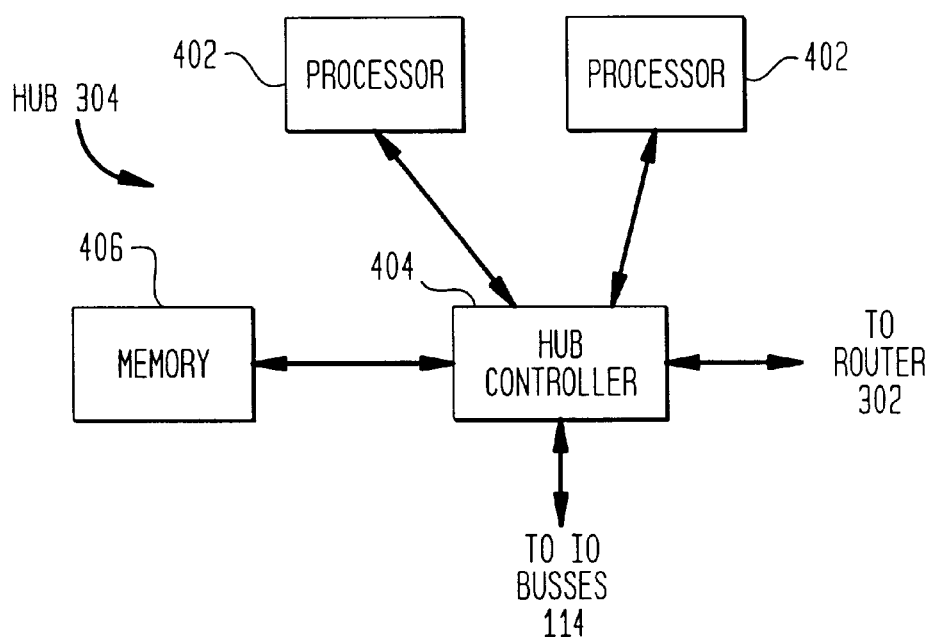
FIG. 4 is a block diagram illustrating an example hub of a node of FIG. 3.
Figure 5:
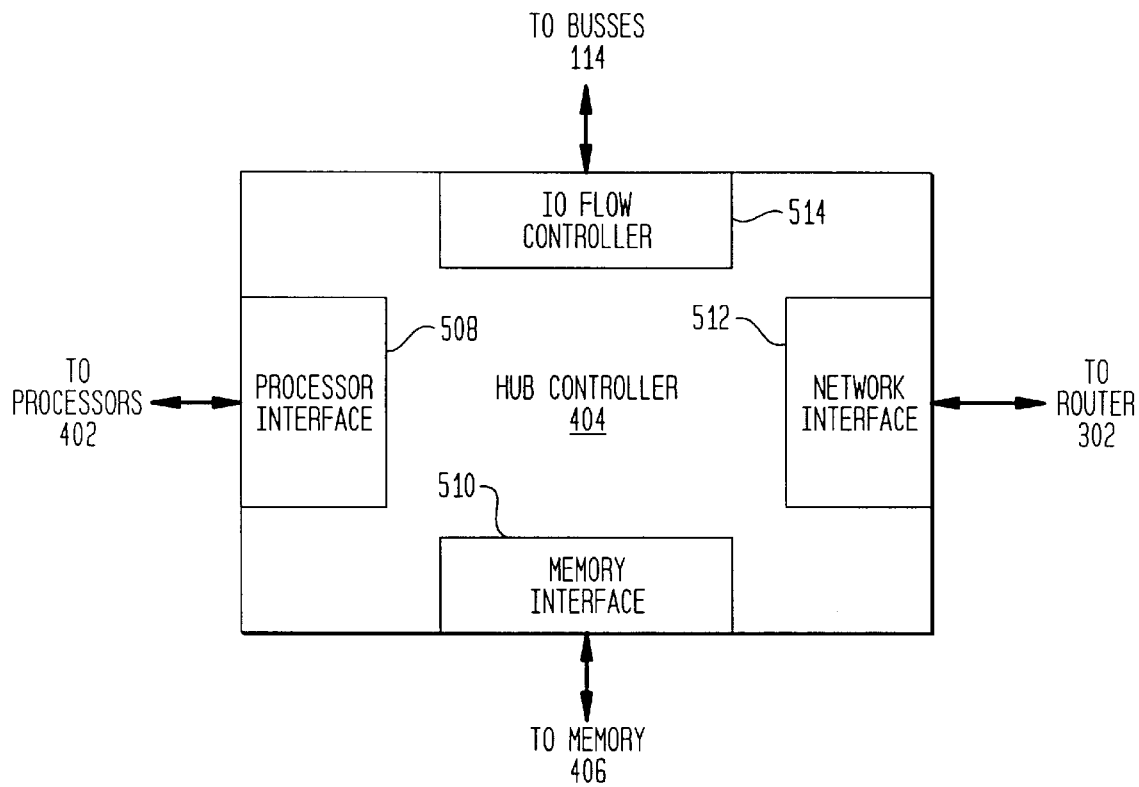
FIG. 5 illustrates the functionality of a hub controller 404 of FIG. 4.

FIG. 4 is a diagram illustrating an example architecture of a hub 304. Hub 304 includes one or more processors 402, a controller 404, and a memory 406. Hub controller 404 provides an interface to processors 402, memory 406, router 302 and to one or more I/O interfaces or busses 114. Hub controller 404 controls access to the resources of hub 304 by other hubs on the network 200. Memory 406 provides memory to processors 402 and can also be shared among processors across network 200 and with I/O busses FIG. 5 illustrates the example architecture of hub controller 404. Hub controller 404 includes a processor interface 508, a memory interface 510, a network interface 512 and an I/O flow controller or an I/O control interface 514. Processor interface 508 is configured to interface one or more processors 402 to network 200. Memory interface 510 is configured to interface memory 406 to network 200. Network interface 512 is configured to interface router 302 to hub 304. I/O flow controller 514 is configured to interface one or more I/O busses or I/O interfaces 114 to network 200.

I/O requests from processors 402 are received by processor interface 508 and transmitted to I/O flow controller 514. I/O flow controller 514 then routes the I/O requests to the appropriate I/O busses. I/O flow controller 514 represents a common access path to the I/O busses. As detailed below, the preferred embodiment of the present invention is implemented using processor interface 508 and I/O flow controller 514.

This description of FIGS. 2–5 is provided to illustrate an example environment for implementation of the I/O flow control system of the invention. More details regarding this example environment can be found in the above-referenced U.S. patent application. However, a person skilled in the relevant art will recognize that the flow control system of the invention has application to many different multiprocessor systems.

The preferred implementation of the invention using processor interface 508 and flow controller 514 is described in detail throughout the remainder of this section. A brief overview of operation is presented here for purposes of introduction.

An object of the flow control system of the invention is to deliver NACKed I/O requests to their respective I/O busses in the proper order. How this is accomplished is described with reference to FIG. 5. I/O flow controller 514 keeps track of the buffer capacity of each I/O bus to which it is connected. It is the responsibility of I/O controller 514 to NACK I/O requests made to a blocked I/O bus. As discussed above, a blocked I/O bus is an I/O bus whose buffer is full so that it cannot post additional requests. For each I/O bus connected to it, flow controller 514 implements the following functionality.

Flow controller 514 has two modes of operation, normal and retry. In normal mode, requests to an I/O bus 114 are ACKed. Once a bus 114 becomes blocked, flow controller 514 will NACK new requests made to that bus. Upon NACKing a request, flow controller 514 enters retry mode for that bus and begins to count the number of NACKed messages which are outstanding. Upon ACKing all NACKed I/O requests (as indicated by the count), I/O flow controller 514 returns to normal mode.

In normal mode, flow controller 514 will accept I/O requests from any source as long as the target I/O bus is not blocked. In retry mode, flow controller 514 will only accept certain requests. This feature is described in connection with the description of processor interface 508.

Processor interface 508 receives I/O requests from particular processors assigned to it. In the preferred embodiment of the invention, hub 304 includes one or two processors. Processor interface 508 implements the functionality described herein for each processor. Processor interface 508 receives I/O requests from a processor 402. These I/O requests are then transmitted to a target I/O bus via an appropriate I/O flow controller 514. Note that the I/O flow controller 514 receiving the I/O requests may be on the same or a different hub 304 from the processor interface 508 sending the I/O requests.

Like flow controller 514, processor interface 508 operates in either normal (processor) mode or retry mode. In normal mode, processor interface 508 will send I/O requests in a normal fashion. However, upon receiving a NACK reply, processor interface will enter retry mode. In retry mode, processor interface 508 will prevent the requesting processor from sending additional requests (e.g., by deasserting write_ready on the processor), will designate NACKed I/O requests as retry requests, and will then retransmit the retry requests to I/O flow controller 514. To maintain the proper ordering of the requests, the first received NACK is designated as a head retry request.

Flow controller 514 will continue to NACK requests to the blocked I/O bus until it becomes unblocked. Once the bus becomes unblocked, flow controller 514 will NACK all request except for head retry requests. Processor interface 508 maintains a request buffer (e.g., a FIFO) of request numbers for each processor. That is, each time a request is sent by processor interface 508, the an number identifying the request is placed in the request buffer. The first sent request will be at the top of the FIFO buffer, while the most recently sent request will be at the bottom of the FIFO. When an ACK reply is received (indicating that a head retry request has been accepted), processor interface 508 will designate the next NACKed request as the new head retry request. Which NACKed request is "next" is indicated by the request number at the top of the request buffer. This may or may not correspond to the order in which the NACKs are actually received at processor interface 508. Thus, the request buffer assures that the NACKed requests are accepted in the proper order even when requests are being NACKed by more than one I/O flow controller.

Each time an ACK reply is received, processor interface 508 will remove the ACKed request number from the top of the request buffer. When the request buffer becomes empty, processor interface 508 will return to normal mode (for the particular processor, since mode is set on a processor by processor basis) and allow the processor to send new requests (e.g., assert write_ready on the processor).

Note that the processor interface may change modes independently of the flow controller. The number of request numbers in the request buffer of processor interface 508 indicates the total number of outstanding NACKed requests from a particular processor to any and all I/O busses. Flow controller 514, on the other hand, maintains a count of the number of outstanding NACKed requests to a particular I/O bus from any and all processors. If a single I/O bus is receiving requests from a single processor, then these the number of NACKed requests being tracked by processor interface 508 and flow controller 514 will be the same. However, if a plurality of processors and buses are involved, then these number of NACKed requests being tracked will appropriately be different.

Note that the scheme keeps NACKed requests in-flight. By "in-flight.," it is meant that the requests are continuously recirculated between processor interface 508 and flow controller 514 until they are accepted. In effect, the NACKed requests are stored "on the wires" until they are accepted. In an alternate embodiment, buffering may be provided in processor interface 508 to store the NACKed request until the target I/O bus becomes unblocked. In another alternate embodiment, only head retries are stored "on the wires" and normal retries may be stored in the processor interface. However, in the preferred embodiment, buffering of requests is not required. The NACKed requests (both head retries and normal retries) are simply kept in-flight and the processor is prevented from sending new requests until the NACKed request have been satisfied. In the preferred embodiment, each processor can have up to eight I/O requests in-flight at any one time.

Note also that a processor 402 may have in-flight or outstanding NACKed requests from more than one I/O bus through the same or different flow controllers 514. In any case, processor interface 508 will designate a single head retry request for the processor 402. In an alternate embodiment, it may be desirable to configure processor interface 508 to use multiple head retry requests so that retries to different buses can each have their own head retry request. This scheme, however, is not required. Acceptable performance in most applications may be achieved using a single head retry request per processor.

Thus, processor interface 508 does not care about the destination of retry requests when selecting a head retry request. Similarly, flow controller 514 does not care which processor is the source of a NACKed request. A particular blocked I/O bus may have outstanding NACKed requests from a number of processors. Flow controller 514 simply tracks the number of NACKed requests and will only accept head retry requests to the particular bus as long as the flow controller is in retry mode for that particular bus.

Figure 6:
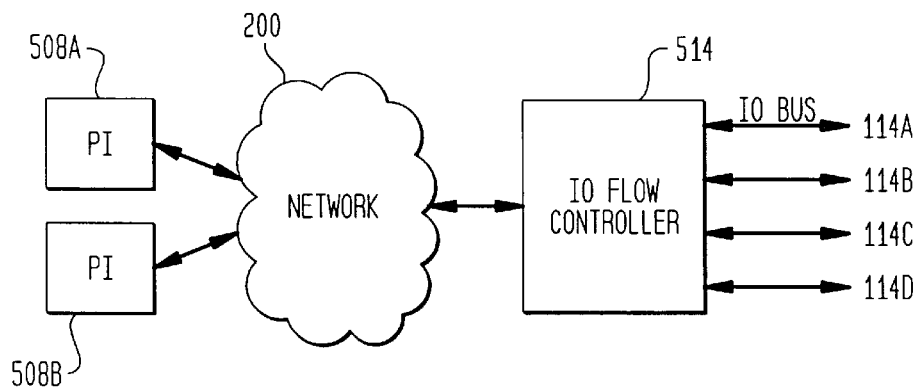
FIG. 6 is a high-level block diagram illustrating I/O flow control in accordance with the present invention.

FIG. 6 illustrates a processor interface 508A, a processor interface 508B, network 200 and an I/O flow controller 514. Network 200 represents the communications network of the multiprocessor. For ease of illustration and discussion, each of processor interfaces 508A,508B is assumed to be associated with and receive I/O requests from a single processor. An I/O request from either of processor interfaces 508A, 508B is communicated to I/O flow controller 514 by network 200. I/O flow controller 514 then delivers the I/O request to the appropriate I/O bus 114.

For each I/O bus 114 connected to I/O flow controller 514, I/O flow controller 514 maintains a credit counter. The credit counter keeps track of the absolute amount of I/O buffer (e.g., FIFO) in the I/O bus. Each time an I/O request to the target bus is accepted into the buffer of flow controller 514, the credit counter for the target bus is decremented. Once the request passes through the FIFO buffer of flow controller 514, it is written to the target I/O bus. Upon receipt and consumption of the write transaction, the I/O bus issues response packets. The response packets are then used by flow controller 514 to credit (increment) the credit counter corresponding to the target I/O bus. Thus, I/O flow controller 514 will always know the status of the I/O buffer of each I/O bus.

If I/O flow controller 514 determines that the I/O buffer of a particular I/O bus is full, then it will NACK additional I/O requests made to that particular I/O bus. Upon NACKing a request, I/O flow controller 514 will enter retry mode for that particular I/O bus as described above. I/O flow controller 514 will continue to NACK I/O requests until the credit counter indicates that the target I/O bus can again accept I/O requests. At that time, I/O flow controller 514 will only accept head retry requests. All other I/O requests (both new and retry) will be NACKed.

In addition to the credit counter, I/O flow controller 514 maintains a count of the number of outstanding NACKed I/O requests for a particular I/O bus. This counter may be called a NACK counter. I/O flow controller 514 remains in retry mode (for a particular bus) until all NACKed requests have been accepted. I/O flow controller 514 will then enter normal mode.

As discussed above, each processor interface 508 also operates in either normal (processor) mode or retry mode. In normal mode, each processor interface 508 will allow multiple I/O requests to be outstanding. If flow controller 514 NACKs an I/O request, then the first NACK returned to the processor causes processor interface 508 to enter retry mode (for the particular processor). This first NACKed request will be labeled a head retry request. The head retry request is then retransmitted to flow controller 514 to be retried. In addition, processor interface 508 deasserts the write_ready signal on the particular processor which issued the I/O request. This will stop the processor from issuing further I/O requests.

As explained above, the mode of flow controller 514 is not tied to the mode of processor interface 508. I/O flow controller 514 may enter retry mode for a particular I/O bus which is being overrun by I/O requests from two separate processor interfaces 508. For example, both processor interface 508A and processor interface 508B may be sending I/O requests to I/O bus 114C. Thus, it is possible for processor 508B to return to normal mode while flow controller 514 remains in retry mode due to outstanding NACKed requests from processor interface 508A.

Once all the outstanding I/O requests of a processor have been accepted, processor interface 508 can assert the write_ready signal, allowing the particular processor to resume normal I/O.

Figure 7:
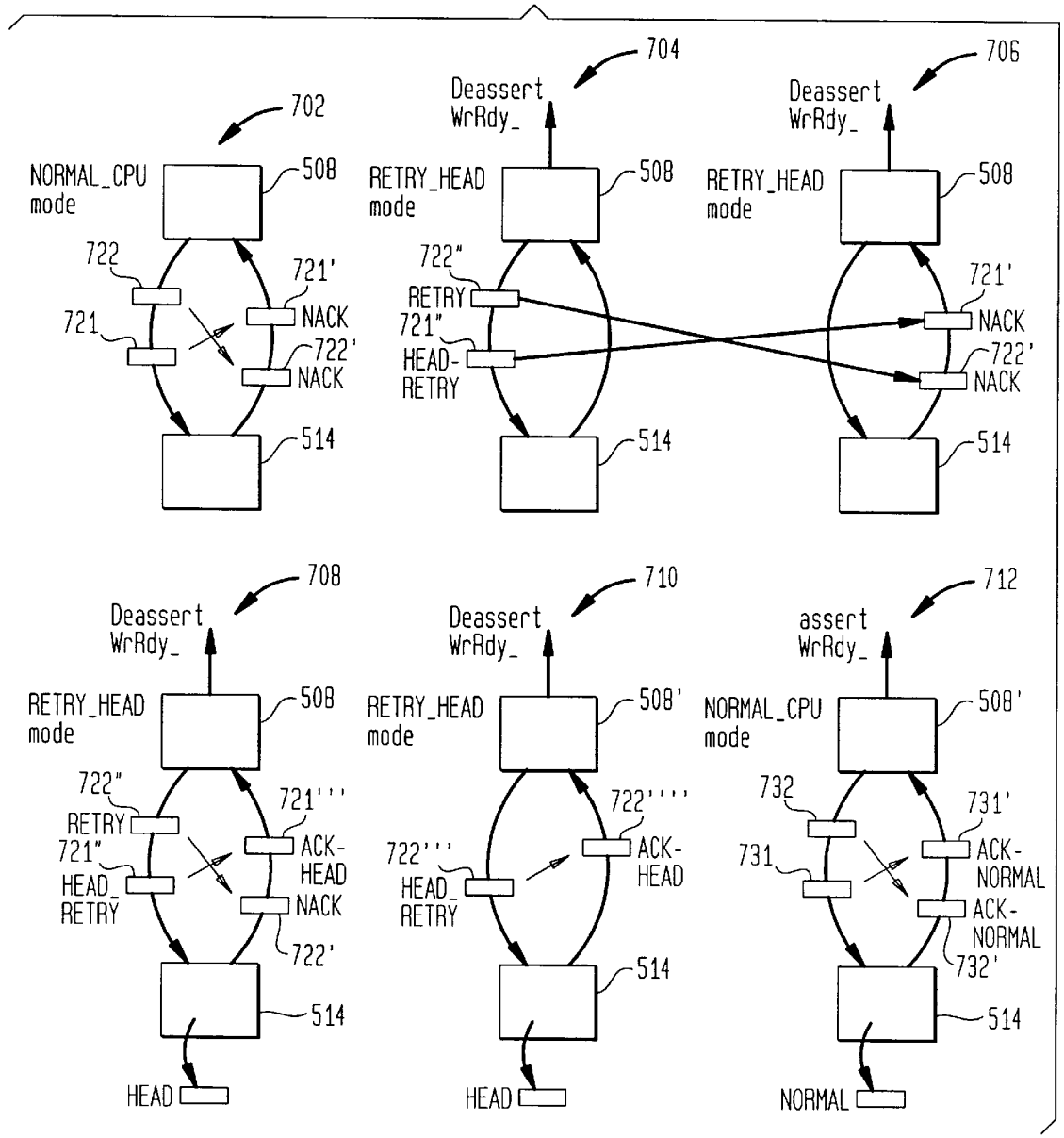
FIG. 7 is a series of diagrams illustrating I/O flow control in accordance with the present invention.

The I/O flow control of the invention may be visualized as a conveyor belt for I/O requests. This is illustrated in FIG. 7, which shows communication between a single processor 402 and a single I/O bus 114 through processor interface 508 and flow controller 514. Because a single processor is communicating with a single I/O bus, processor interface 508 and flow controller 514 will change together between normal and retry modes of operation.

Diagram 702 shows processor interface 508, in normal mode, issuing I/O requests 721,722 I/O requests 721,722 are NACKed by I/O flow controller 514 to produce NACKed requests 721',722', respectively.

Diagram 704 shows NACKed request 721' being retried as head retry request 721" and NACKed request 722' being retried as retry request 722". Note that the processor interface has entered retry mode and has deasserted write_ready on the requesting processor to prevent further I/O requests.

In diagram 706, the I/O flow controller has NACKed both head retry request 721" and retry request 722". In diagram 708, the target bus becomes available. The flow controller then accepts head retry request 721" and returns an ACK reply 721'". Retry request 722" is NACKed to produce NACKed request 722'.

In diagram 710, the processor interface returns NACKed request 722' as head retry request 722'". Head retry request 722'" is accepted by the flow controller and an ACK reply 722"" is returned to the processor interface. The last outstanding NACKed request being ACKed, the processor interface and the flow controller return to normal mode as indicated in diagram 712. This allows the flow controller to accept requests 731,732 and to return ACK replies 731',732' to the processor interface.

Note in FIG. 7 that two types of ACK replies are used, ACK-HEAD and ACK-NORMAL. ACK-HEAD informs processor interface 508 that a head retry request has been accepted. ACK-NORMAL informs processor interface 508 that a normal request has been accepted.

Figure 8:
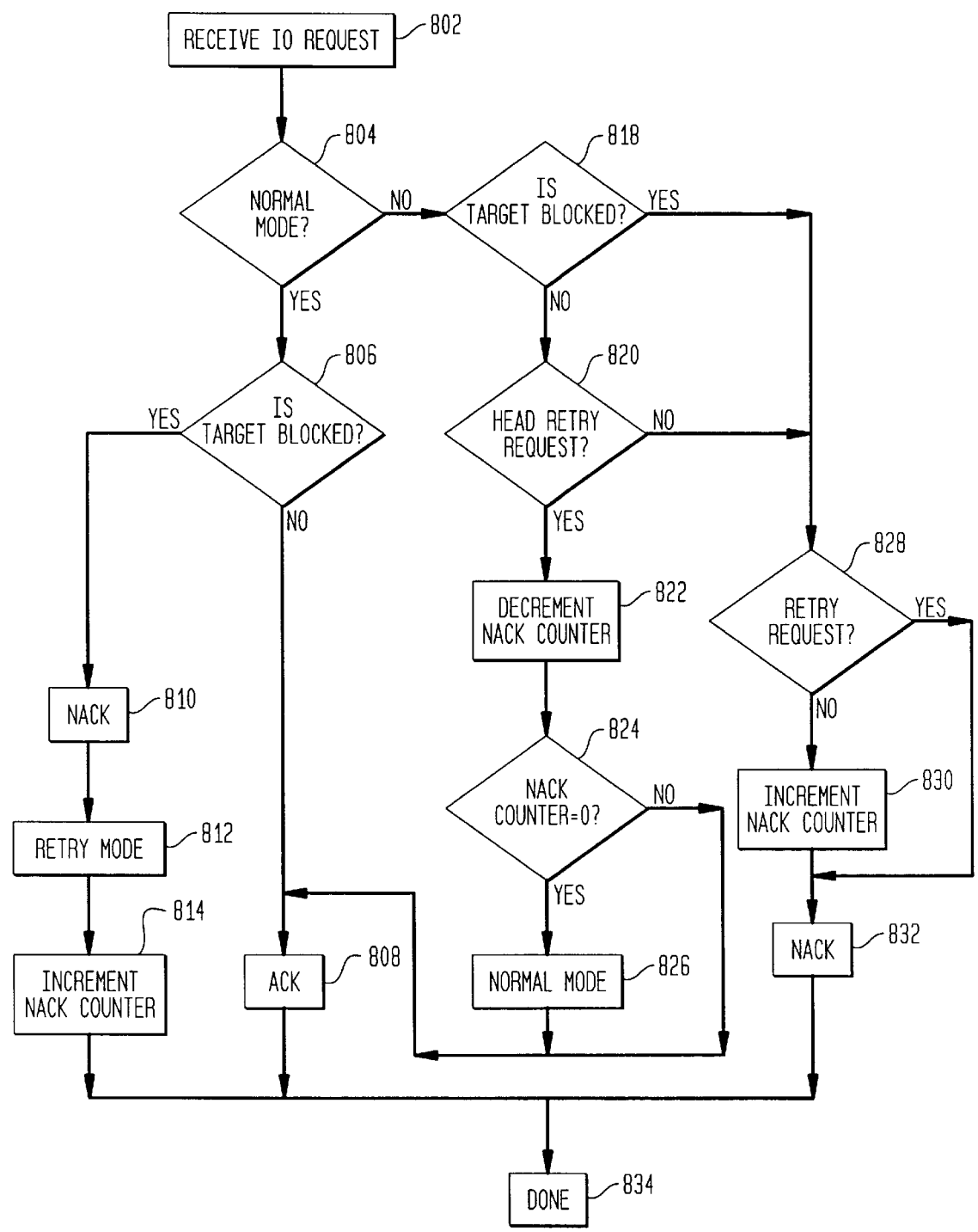
FIG. 8 is a flow chart illustrating operation of a flow controller 514 of the present invention.

FIG. 8 is a flow chart illustrating operation of I/O flow controller 514 in accordance with the invention. In FIG. 8, the term "source" is used to represent the device (e.g., a processor interface or processor) making an I/O request. The term "target" is used to represent the device (e.g., I/O bus) to which an I/O request is directed.

In step 802, flow controller 514 receives an I/O request. In step 804, it is determined whether the controller is in normal mode. If the controller is in normal mode, the method proceeds to step 806. In step 806, it is determined whether the target is blocked. This is accomplished by checking the credit counter for the target. If the target is not blocked, then the I/O request is accepted and an ACK is sent to the source in step 808.

If it is determined that the particular target is blocked at step 806, then the I/O request is NACKed at step 810, retry mode is entered at step 812 and a NACK counter is incremented at step 814. The NACK counter keeps track of the number of outstanding NACKs for the particular target. Flow controller 514 will stay in retry mode until the NACK counter indicates that all outstanding NACKs have been accepted.

If it is determined at step 804 that the controller 514 is not in normal mode, then the method proceeds to step 818. At step 818, it is determined whether the target is blocked. If the target is not blocked, then the method proceeds to step 820. At step 820, it is determined whether the I/O request is a head retry request. If the request is a head retry request, then the method proceeds to step 822. In step 822, the NACK counter is decremented. Then, in step 824, it is checked to see whether the counter is equal to zero. If the counter is equal to zero, the normal mode is entered in step 826. If the counter is not equal to zero, then normal mode is not entered. In either case, an ACK is issued at step 808 as a result of the head retry request being accepted.

If at step 818 it is determined that the target is busy or at step 820 that the request is not a head retry request, then the method proceeds to step 828. At step 828, it is determined whether the I/O request is a retry. If the request is not a retry, then the NACK counter is incremented at step 830 and the I/O is NACKed at step 832. If, at step 828, it is determined that the I/O request is a retry, then the target counter is not incremented at step 830. The method ends at step 834.

Figure 9:
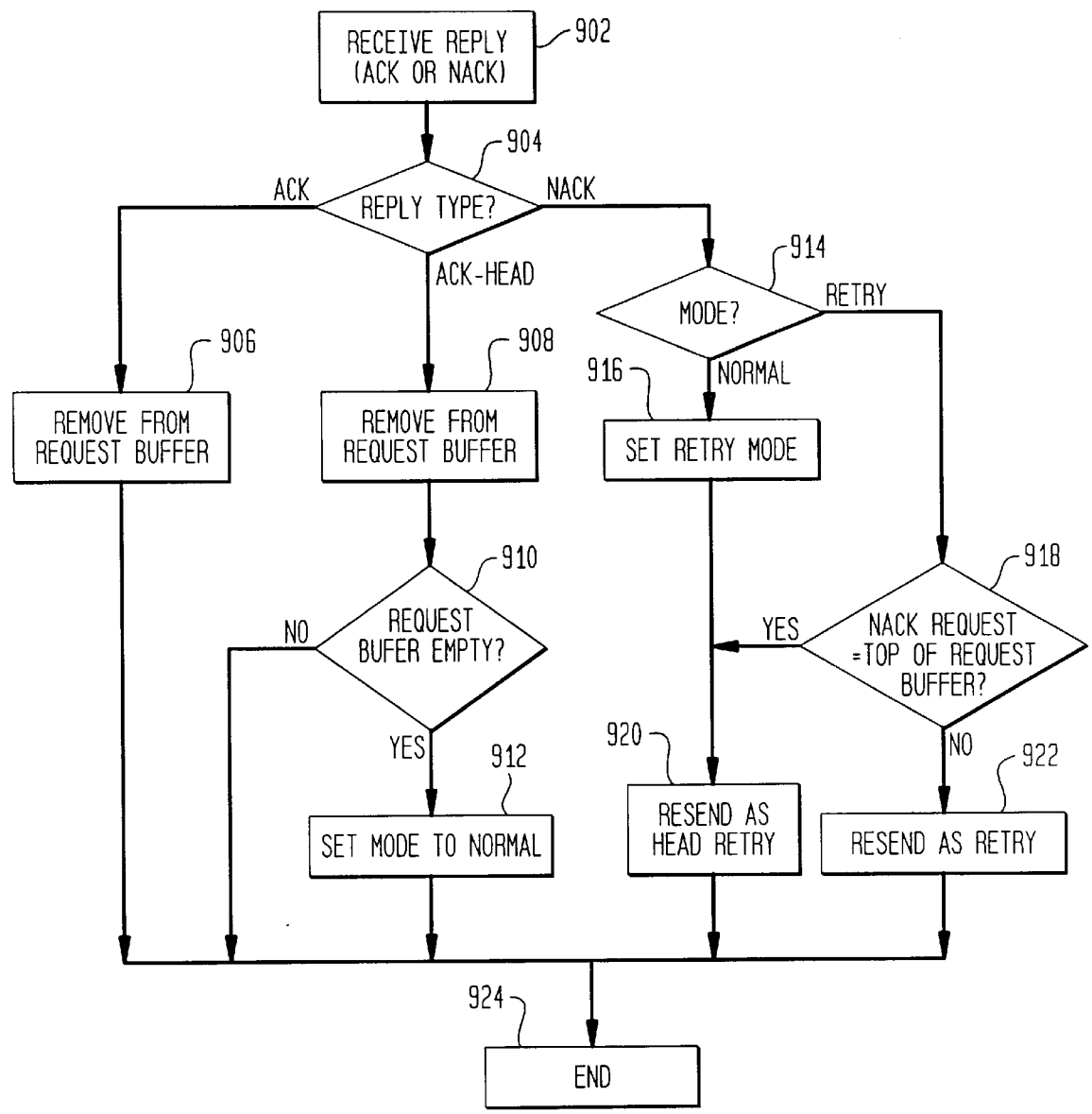
FIG. 9 is a flow chart illustrating operation of a processor interface 508 of the present invention.

FIG. 9 illustrates the method of operation of a processor interface 508. In a step 902, a reply is received from an I/O flow controller 514. At step 904, it is determined whether the reply is an ACK, ACK-HEAD or a NACK. If the reply is an ACK, then the request number is removed from the request buffer at step 906 and the method ends at step 924. If the reply is an ACK-HEAD, then the request number is removed from the request buffer at step 908 and the method proceeds to step 910. In step 910, it is determined whether the request buffer is empty. If the request buffer is not empty, then the method ends at step 924. If the buffer is empty, then processor interface 508 enters normal mode at step 912.

If it is determined at step 904 that the reply is a NACK, then the method proceeds to step 914. At step 914, it is determined whether the processor interface is in normal mode or retry mode. If the processor interface is in normal mode, the mode is set to retry mode at step 916. The NACKed request is then resent as a head retry request at step 920. If it is determined at step 914 that the processor interface is in retry mode, then it is determined at step 918 whether the request number for the NACKed request is at the top of the request buffer. If the NACKed request is at the top of the request buffer, then the method proceeds to step 920 where the request is resent as a head retry request. Otherwise, the request is resent as a normal retry. The method then ends at step 924.

Figure 10:
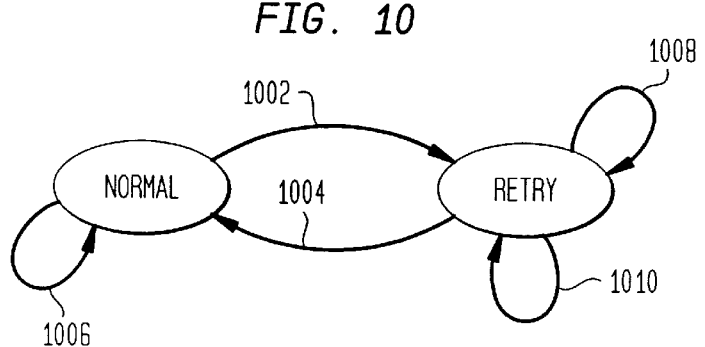
FIG. 10 is a state diagram showing the states of operation of flow controller 514.

FIG. 10 is a state diagram illustrating the states of I/O flow controller 514. The two operational states of I/O flow controller 514 include the normal state and retry state. Transition vector 1002 indicates a transition from normal state to retry state. This transition will occur if a target I/O bus is blocked. In conjunction with this transition, an I/O request is NACKed and the NACK counter of the flow controller is incremented.

Transition vector 1004 represents a transition from retry state back to normal state. This transition will occur when the number of outstanding NACKed requests is equal to one, the target I/O bus is not busy, and the received I/O request is a head retry request. In connection with this transition, the NACK counter is decremented to zero.

State transition vector 1006 represents normal operation of I/O flow controller 514 in normal mode. This state is maintained so long as the target I/O bus is not blocked.

State transition vector 1008 represents operation of I/O flow controller 514 when in retry mode and the target I/O bus is blocked. This transition involves NACKing all request to the target bus.

State transition vector 1010 represents operation of I/O flow controller 514 when the target I/O bus is not busy, a head retry request is received and the count is greater than one. In this case, the head retry request will be ACKed, and the NACK counter will be decremented.

Figure 11:
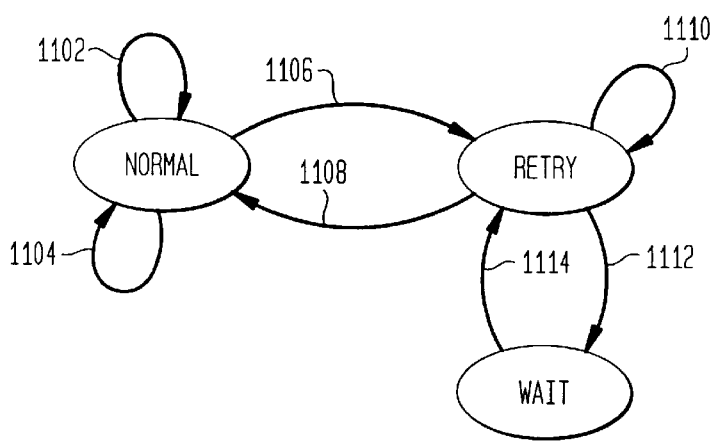
FIG. 11 is a state diagram showing the states of operation of processor interface 508.

FIG. 11 is a state diagram of processor interface 508. Processor interface 508 includes three states: normal, retry and wait. State transition vector 1102 represents normal operation when an I/O request is sent and the request number is entered into the request buffer.

State transition vector 1104 indicates normal operation when an ACK reply is received. When this occurs, the request number for the ACKed request is removed from the request buffer.

State transition vector 1106 represents a transition from normal state to retry state. This occurs when a NACK is received. In connection with this transition, the I/O request is retransmitted as a head retry request. In addition, write_ready is deasserted on the transmitting processor to stop further I/O requests.

State transition vector 1108 represents a transition from retry state to normal state. This occurs when a head retry is ACKed, resulting in an empty request buffer. In connection with this change of states, the write_ready signal is asserted to permit the processor to freely send I/O requests.

State transition vector 1110 represents retransmission of a previously NACKed signal. No further action is taken when a previously NACKed signal is retransmitted.

State transition vector 1112 represents a transition from retry state to wait state. This transition occurs when a head retry request is ACKed and the request buffer is not empty (indicating that additional NACKed requests must be ACKed before returning to normal state) after removing the ACKed request number from the request buffer. The processor interface will then wait for the next (as indicated by the request buffer) NACK request to arrive so that it can be resent as the head retry request.

State transition vector 1114 represents a change in state from the wait state to the retry state. This occurs when a new head retry request is transmitted.

Circumstances can be imagined in which a processor is effectively starved because it competes for a particular bus but is consistently NACKed while other processor have their requests accepted. For example, if two processors (e.g., processors A and B) are competing for a single bus which is blocked, timing conditions may exist such that each time the bus is unblocked, a head retry request of processor A arrives and is accepted. When the head retry request of processor B arrives after acceptance of the request from processor A, the bus is again blocked and processor B's request is NACKed. The present invention anticipates that such a scenario is possible. To prevent a processor from having its I/O requests starved in favor of another processor's I/O requests, one embodiment of the invention implements an alternating flow control scheme.

Figure 12:
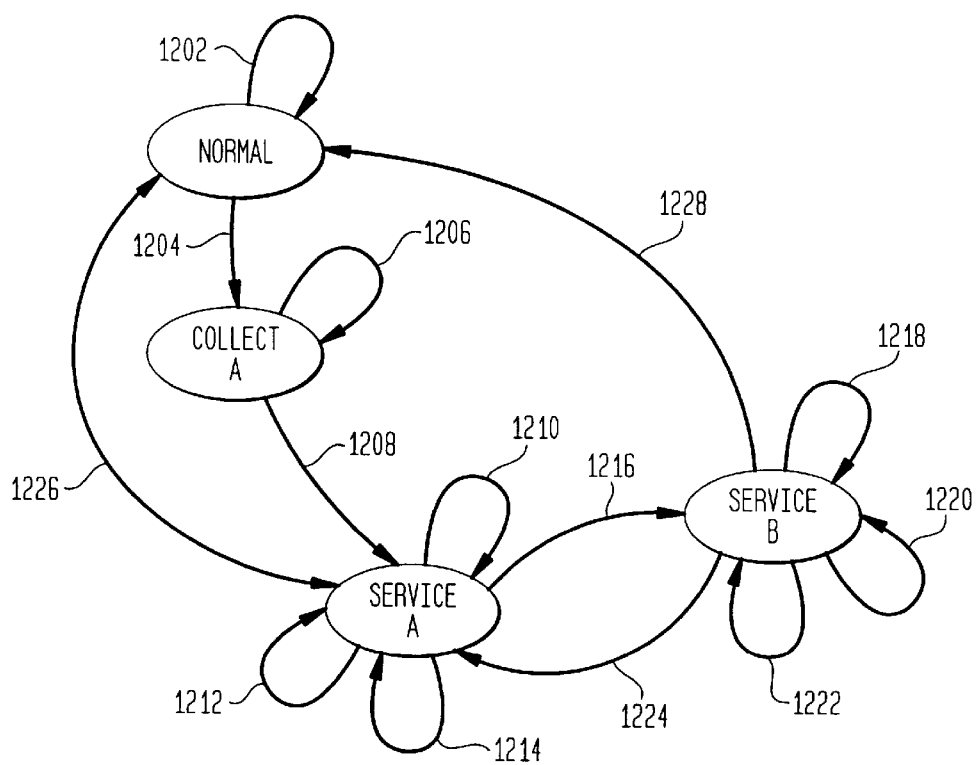
FIG. 12 is a state diagram showing the states of operation of flow controller 514 in an embodiment which alternates states to assure equal sharing of an I/O resource.

The alternating flow control scheme of the invention is described with reference to FIG. 12. FIG. 12 is a state diagram representing the states of I/O flow controller 514 in one embodiment of the invention. With several processors transmitting retry and head retry requests to a particular I/O box, it is possible for I/O flow controller 514 to unknowingly satisfy only head retry requests from a single processor interface. To prevent this from happening and insure equal sharing of the resources of an I/O bus, I/O flow controller is implemented having two different retry states. These retry states are indicated as service A and service B. State transition vector 1202 represents normal operation of flow controller 514 in which an I/O request is ACKed.

State transition vector 1204 represents a NACK of an I/O request. This causes a transition from normal state to collect A state. In collect A state, as represented by state transition vector 1206, all NACKs are labeled "A". I/O flow controller 514 will remain in state collect A until the target becomes unblocked.

State transition vector 1208 represents a change in state from collect A state to service A state. This transition occurs when the target becomes unblocked and a retry head request_A (previously a NACK_A) is ACKed. In service A state, all retry requests_A are serviced by the flow controller. If the bus is not blocked, retry requests_A are serviced as represented by state transition vector 1210. If the bus is blocked, retry requests_A are NACKed as represented by state transition vector 1212. If any new requests from any source are NACKed during service A state, they are labeled "B." This is represented by state transition vector 1214.

A transition from service A state to service B state occurs when all retry requests_A have been ACKed and flow controller 514 remains in retry mode. This transition is represented by state transition vector 1216. If all retry requests_A have been accepted and no retry requests_B have been collected, then a transition to normal state occurs as represented by state transition vector 1226.

In service B state, all retry requests_B are serviced by the flow controller. If the bus is not blocked, retry requests_B are serviced as represented by state transition vector 1218. If the bus is blocked, retry requests_B are NACKed as represented by state transition vector 1220. If any new requests from any source are NACKed during service B state, they are labeled "A." This is represented by state transition vector 1222.

A transition from service B state to service A state occurs when all retry requests_B have been ACKed. This transition is represented by state transition vector 1224. If all retry requests_B have been accepted and no retry requests_A have been collected, then a transition to normal state occurs as represented by state transition vector 1228.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. An input/output flow control system for use with a processor system having an input/output request source and a plurality of input/output request targets, the input/output flow control system comprising:

(a) flow control means associated with each of the targets for receiving input/output requests from the source, for accepting a request if an intended target can accept the request, and for negatively acknowledging a request if the intended target cannot accept the request, said flow control means having reply means acknowledging acceptance of a request, NACK means for negatively acknowledging acceptance of a request if the intended target cannot accept the request, first NACK counter means for tracking a number of outstanding negatively acknowledged requests for the intended target and for maintaining said flow control means in retry mode for the intended target as long as negatively acknowledged requests to the intended target are outstanding, and filter means for accepting only head retry requests during said retry mode; and (b) retry means, associated with the source, for resending said negatively acknowledged requests to the intended target and for cooperating with said flow control means so that said negatively acknowledged requests are accepted by said flow control means in a proper order, wherein, said flow control means and said retry means continuously recirculate at least said head retry requests between said flow control means and said retry means until said negatively acknowledged requests are accepted by said flow control means.

2. The input/output flow control system of claim 1, wherein said retry means comprises:

means for receiving acknowledgment replies and negatively acknowledged requests from said flow control means;

buffer means for maintaining an order of said negatively acknowledged requests;

means for resending, in accordance with said order maintained by said buffer means, said negatively acknowledged requests to said flow control means with one of said negatively acknowledged requests being indicated a head retry request and all other negatively acknowledged requests as retry requests; and means, cooperating with said buffer means and said resending means, for selecting said head retry request from said negatively acknowledged requests based upon said order.

3. The input/output flow control system of claim 2, wherein said flow control means further comprises:

means for operating said flow control means in a first state in which all requests which are negatively acknowledged are negatively acknowledged bearing a first marker and in which only head retry requests bearing a second marker are accepted;

means for operating said flow control means in a second state in which all requests which are negatively acknowledged are negatively acknowledged bearing said second marker and in which only head retry requests bearing said first marker are accepted;

means for operating said flow control means in a third state when the intended target can accept a request;

means for operating said flow control means in a fourth state when the intended target cannot accept a request;

means for switching operation of said flow control means, if operating said flow control means in said first state, upon acceptance of all outstanding negatively acknowledged requests bearing said second marker, to said second state if negatively acknowledged requests bearing said first marker are outstanding, and to said third state if no negatively acknowledged requests are outstanding;

means for switching operation of said flow control means, if operating said flow control means in said second state, upon acceptance of all outstanding negatively acknowledged requests bearing said first marker, to said first state if negatively acknowledged requests bearing said second marker are outstanding, and to said third state if no negatively acknowledged requests are outstanding;

means for switching operation of said flow control means, if operating said flow control means in said third state to said fourth state upon negative acknowledgement of a request; and means for switching operation of said flow control means, if operating said flow control means in said fourth state, to said first state, upon acceptance of a negatively acknowledged request.

4. An input/output flow control method for use with a multiprocessor system having a plurality of input/output request sources communicating with a plurality of input/output request targets over a common path, the method comprising the steps of:

(a) receiving input/output requests from the plurality of sources at flow control means;

(b) accepting a request at said flow control means if the intended target can accept the request;

(c) negatively acknowledging a request if the intended target cannot accept the request;

(d) maintaining, for each source, an order in which said requests are made;

(e) selecting, for each source having outstanding negatively acknowledged requests, one of said negatively acknowledged requests;

(f) resending to the intended target from retry means associated with each source having outstanding negatively acknowledged request, said selected negatively acknowledged request as a head retry request;

(g) resending from said retry means to the intended target any other negatively acknowledged requests as retry requests;

(h) accepting only head retry requests at said flow control means as long as negatively acknowledged requests to the intended target are outstanding; and (i) repeating said method until all requests, for each source, have been accepted by the intended targets, wherein, said flow control means and said retry means continuously recirculate said negatively acknowledged requests between said flow control means and said retry means until said negatively acknowledged requests are accepted by said flow control means.

5. The method of claim 4, wherein said step (c) of negatively acknowledging further comprises the steps of:

i) operating said flow control means in a first state in which all requests which are negatively acknowledged are negatively acknowledged bearing a first marker and in which only head retry requests bearing a second marker are accepted;

ii) operating said flow control means in a second state in which all requests which are negatively acknowledged are negatively acknowledged bearing said second marker and in which only head retry requests bearing said first marker are accepted;

iii) operating said flow control means in a third state when the intended target can accept a request;

iv) operating said flow control means in a fourth state when the intended target cannot accept a request;

v) if operating said flow control means in said first state, switching operation of said flow control means, upon acceptance of all outstanding negatively acknowledged requests bearing said second marker, to said second state if negatively acknowledged requests bearing said first marker are outstanding, and to said third state if no negatively acknowledged requests are outstanding;

vi) if operating said flow control means in said second state, switching operation of said flow control means, upon acceptance of all outstanding negatively acknowledged requests bearing said first marker, to said first state if negatively acknowledged requests bearing said second marker are outstanding, and to said third state if no negatively acknowledged requests are outstanding;

vii) if operating said flow control means in said third state, switching operation of said flow control means, upon negative acknowledgement of a request, to said fourth state; and viii) if operating said flow control means in said fourth state, switching operation of said flow control means, upon acceptance of a negatively acknowledged request, to said first state.

6. An input/output flow control system for providing an interface between a plurality of processors in a multiprocessor system and a plurality of input/output buses, the input/output flow control system comprising:

(a) flow control means associated with each of the plurality of busses for receiving input/output requests from each of the plurality of processors, for accepting a request if an intended bus can accept the request, and for negatively acknowledging a request if the intended bus cannot accept the request, said flow control means having reply means acknowledging acceptance of a request, NACK means for negatively acknowledging acceptance of a request if the intended bus cannot accept the request, first NACK counter means for tracking a number of outstanding negatively acknowledged requests for the intended bus and for maintaining said flow control means in retry mode for the intended bus as long as negatively acknowledged requests to the intended bus are outstanding, and filter means for accepting only head retry requests during said retry mode; and (b) retry means, associated with each of the plurality of processors, for resending said negatively acknowledged requests to the intended bus and for cooperating with said flow control means so that said negatively acknowledged requests are accepted by said flow control means in a proper order, wherein, said flow control means and said retry means continuously recirculate at least said head retry requests between said flow control means and said retry means until said negatively acknowledged requests are accepted by said flow control means.

7. The input/output flow control system of claim 6, wherein said retry means comprises:

means for receiving acknowledgment replies and negatively acknowledged requests from said flow control means;

buffer means for maintaining an order of said negatively acknowledged requests;

means for resending, in accordance with said order maintained by said buffer means, said negatively acknowledged requests to said flow control means with one of said negatively acknowledged requests being indicated a head retry request and all other negatively acknowledged requests as retry requests; and means, cooperating with said buffer means and said resending means, for selecting said head retry request from said negatively acknowledged requests based upon said order.

8. An input/output flow control system for use with a processor system having an input/output request source and a plurality of input/output request targets, the input/output flow control system comprising:

(a) flow control means associated with each of the targets for receiving input/output requests from the source, for accepting a request if an intended target can accept the request, and for negatively acknowledging a request if the intended target cannot accept the request, said flow control means comprising reply means acknowledging acceptance of a request, NACK means for negatively acknowledging acceptance of a request if the intended target cannot accept the request, first NACK counter means for tracking a number of outstanding negatively acknowledged requests for the intended target and for maintaining said flow control means in retry mode for the intended target as long as negatively acknowledged requests to the intended target are outstanding, and filter means for accepting only head retry requests during said retry mode; and (b) retry means, associated with the source, for resending said negatively acknowledged requests to the intended target and for cooperating with said flow control means so that negatively acknowledged requests are accepted by said flow control means in a proper order, said retry means comprising means for receiving acknowledgment replies and said negatively acknowledged requests from said flow control means, buffer means for maintaining an order of said negatively acknowledged requests, means for resending, in accordance with said order maintained by said buffer means, said negatively acknowledged requests to said flow control means with one of said negatively acknowledged requests being indicated a head retry request and all other negatively acknowledged requests as retry requests, and means, cooperating with said buffer means and said resending means, for selecting said head retry requests from said negatively acknowledged requests based upon said order.

9. The input/output flow control system of claim 8, wherein said flow control means further comprises:

means for operating said flow control means in a first state in which all requests which are negatively acknowledged are negatively acknowledged bearing a first marker and in which only head retry requests bearing a second marker are accepted;

means for operating said flow control means in a second state in which all requests which are negatively acknowledged are negatively acknowledged bearing said second marker and in which only head retry requests bearing said first marker are accepted;

means for operating said flow control means in a third state when the intended target can accept a request;

means for operating said flow control means in a fourth state when the intended target cannot accept a request;

means for switching operation of said flow control means, if operating said flow control means in said first state, upon acceptance of all outstanding negatively acknowledged requests bearing said second marker,
- to said second state if negatively acknowledged requests bearing said first marker are outstanding, and
- to said third state if no negatively acknowledged requests are outstanding;

means for switching operation of said flow control means, if operating said flow control means in said second state, upon acceptance of all outstanding negatively acknowledged requests bearing said first marker,
- to said first state if negatively acknowledged requests bearing said second marker are outstanding, and
- to said third state if no negatively acknowledged requests are outstanding;

means for switching operation of said flow control, if operating said flow control means in said third state, to said fourth state upon negative acknowledgment of a request; and means for switching operation of said flow control means, if operating said flow control means in said fourth state, to said first state, upon acceptance of a negatively acknowledged request.

10. An input/output flow control system for providing an interface between a plurality of processors in a multiprocessor system and a plurality of input/output buses, the input/output flow control system comprising:

(a) flow control means associated with each of the plurality of busses for receiving input/output requests from each of the plurality of processors, for accepting a request if an intended bus can accept the request, and for negatively acknowledging a request if the intended bus cannot accept the request, said flow control means comprising reply means acknowledging acceptance of a request, NACK means for negatively acknowledging acceptance of a request if the intended bus cannot accept the request, first NACK counter means for tracking a number of outstanding negatively acknowledged requests for the intended bus and for maintaining said flow control means in retry mode for the intended bus as long as negatively acknowledged requests to the intended bus are outstanding, and filter means for accepting only head retry requests during said retry mode; and (b) retry means, associated with each of the plurality of processors, for resending said negatively acknowledged requests to the intended bus and for cooperating with said flow control means so that negatively acknowledged requests are accepted by said flow control means in a proper order, said retry means comprising means for receiving acknowledgment replies and said negatively acknowledged requests from said flow control means, buffer means for maintaining an order of said negatively acknowledged requests, means for resending, in accordance with said order maintained by said buffer means, said negatively acknowledged requests to said flow control means with one of said negatively acknowledged requests being indicated a head retry request and all other negatively acknowledged requests as retry requests, and means, cooperating with said buffer means and said resending means, for selecting said head retry requests from said negatively acknowledged requests based upon said order.

* * * * *